Figure 1:
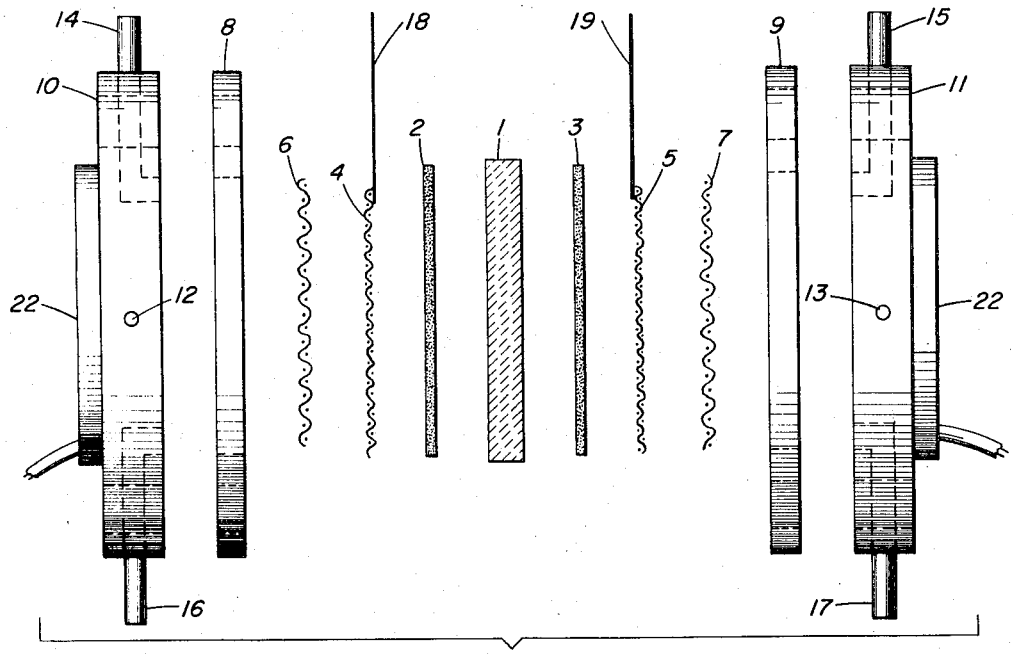

Dec. 12, 1967  L. K. ZIERING  3,357,863

RHODIUM CATALYST AND FUEL CELL

Filed Jan. 21, 1966

INVENTOR.
LANCE KENNETH ZIERING
BY
*Harry H. Kline*
ATTORNEY

United States Patent Office 3,357,863
Patented Dec. 12, 1967

3,357,863
RHODIUM CATALYST AND FUEL CELL
Lance Kenneth Ziering, Stamford, Conn., assignor to American Cyanamid Company, Stamford, Conn., a corporation of Maine
Filed Jan. 21, 1966, Ser. No. 522,244
6 Claims. (Cl. 136—86)

The present invention relates to a novel multicatalyst electrode eminently suitable for use in typical fuel cells, such as hydrogen-oxygen or hydrogen-air fuel cells. More particularly, it relates to a novel polycomponent-catalytic electrode comprising a catalytic mixture of rhodium and an amorphous, reduced tungsten oxide operable in fuel cells which employ readily available hydrogen fuel contaminated with carbon monoxide.

It is known that many kinds of noble and non-noble metallic catalysts have been utilized in formed electrodes. When utilizing such electrodes in fuel cells operating on hydrogen as the fuel and oxygen or air as the oxidant, the purity of the hydrogen fuel is singularly critical, for otherwise performance of the cell utilizing a carbon monoxide-contaminated hydrogen is markedly decreased. Specifically, electrodes perform rather poorly with increasing current densities and attendant decrease in voltages when the hydrogen fuel contains even miniscule amounts of carbon monoxide. This effect is particularly noted where the concentration of carbon monoxide in the hydrogen gas is as low as forty parts per million at room temperature. To improve the cell's performance, readily available commercial hydrogen is usually purified prior to its introduction into the fuel cell to effect removal of as much carbon monoxide as possible. This procedure, undesirably, increases costs substantially in operating a fuel cell. Thus, the use of such carbon monoxide-contaminated hydrogen is not wholly acceptable.

It is, therefore, a principal object of the present invention to provide a formed, relatively inexpensive, multicatalyst electrode which permits a fuel cell to operate at high voltages and current densities on commercially available hydrogen contaminated with carbon monoxide. A further object is to provide a straightforward method for preparing such enhanced electrodes supported on either a metallic or a non-metallic substrate. These and other advantages will become apparent from a consideration of the ensuing detailed description.

To this end, it has been unexpectedly found that a polycomponent catalyst mixture comprising rhodium and reduced, amorphous tungsten oxide can markedly enhance an electrode prepared therefrom to an extent hitherto unknown. While it is known that a mixture, for instance, of platinum and tungsten oxide can be employed as a catalytic electrode material, performance of the electrode is nonetheless poor when employing relatively inexpensive, carbon monoxide-contaiminated hydrogen fuel. Only when utilizing substantially pure hydrogen as a fuel is performance improved in such systems. However, in utilizing the polycomponent catalytic or metallic system of the present invention, there is noted a substantially enhanced performance of an overall fuel cell in contradistinction to the use of platinum alone or even platinum and tungsten mixtures, while operating on commercially available hydrogen gas which is contaminated with carbon monoxide.

According to the process of the invention, the novel catalyst mixture suitable for use as the electrode for a fuel cell utilizing carbon monoxide-impure hydrogen can be prepared by a straightforward procedure which involves the steps of initially admixing in an aqueous environment an alkali metal borohydride, such as sodium borohydride or potassium borohydride, and a mixture comprising: (a) rhodium halide, such as rhodium chloride or rhodium bromide and (b) ammonium or an alkali metal metatungstate. There results a co-precipitated catalyst mixture containing essentially active rhodium metal as well as reduced, amorphous oxide of tungsten. Resultant mixture is combined with (a) a binder-waterproofing agent, such as polytetrafluoroethylene, polychlorotrifluoroethylene or polyethylene and (b) mineral oil to form a paste of the same.

In general, a wide range of catalyst components can be tolerated in the overall electrode. For instance, there is contemplated utilizing from about 80% to about 95% rhodium and from about 5% to about 20% reduced tungsten oxide on a weight basis. However, it has been found that for superior performance of the overall electrode a mixture comprising 85% rhodium and 15% reduced tungsten oxide is employed.

Advantageously, a portion of each of the aforementioned rhodium or metatungstate component may be substituted in the process of the invention. Thus, not more than up to about 50% of the rhodium metal content may be substituted by another noble metal, such as platinum or palladium. In addition, the tungsten oxide content may, if desired, be diluted by as much as 50% of molybdenum oxide. Thus, in the preparation of the polycomponent catalyst system herein defined, from 0% to 30% chloroplatinic acid, 30% to 60% rhodium halide and 40% ammonium metatungstate can be admixed to recover a catalyst having the following composition:

| | Percent |
|---|---|
| (a) Rhodium | 40–95 |
| (b) Platinum | 0–47.5 |
| and | |
| (c) Reduced tungsten oxide | 5–20 |

In general, a supporting grid or screen may advantageously be employed to receive the aforementioned catalyst mixture. The grid material to be used is chosen for its ability to withstand any corrosive condition which may exist in the particular acid electrolyte system. Illustrative of a suitable grid is: stainless steel, tantalum or acrylic fiber paper. In forming the electrode of the present invention, it is preferred to spread the polycomponent catalyst paste on the screen or grid and then to dry the resultant structure. It is preferred to incorporate from about 5 to about 40 milligrams of total catalyst mixture per square centimeter of electrode surface, depending on the quantity of carbon monoxide impurity in the fuel. If the carbon monoxide content is low, i.e., below about 0.01%, as little as five milligrams per square centimeter may be used. Where carbon monoxide content is high, i.e., above about 1%, as much as twenty to forty milligrams per square centimeter can be utilized to advantage.

In a typical fuel cell, a membrane or matrix separates two electrodes which contact either a fuel or an oxidant. The matrix is usually saturated with electrolyte. Exemplary matrices are: ordinary filter paper, glass fiber paper, asbestos mat and polymeric ion exchange materials. For illustrative purposes, ordinary glass fiber paper saturated with 5 N sulfuric acid is employed herein as the separating matrix.

In general, fuel cells hereinbelow defined and which fall within the purview of the present invention comprise three essential elements: acid electrolyte, electrodes or electrocatalysts, one of which comprises the electrode of the present invention, and current collectors. Suitable collectors can be perforated, or corrugated plates or metallic screens and equivalents thereof.

To further clarify the invention, these and other embodiments thereof are shown in the accompanying drawing and will be described in detail in conjunction with said drawing.

Figure 2:
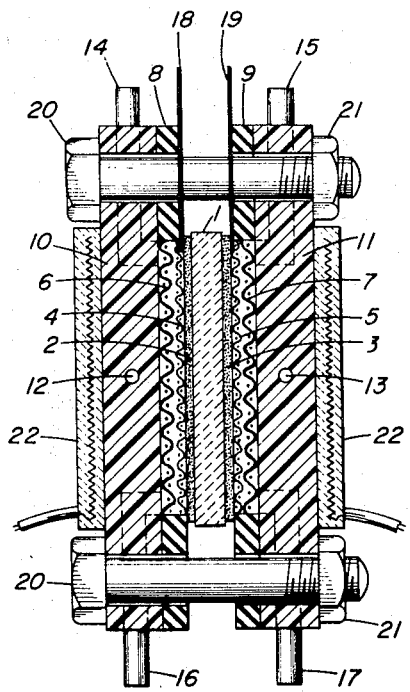

In the drawing:

FIGURE 1 is an exploded plan view, partially in section, of a fuel cell employing the electrode of the present invention, and FIGURE 2 is a partially expanded side view, partially in section, of the fuel cell of FIGURE 1.

In FIGURE 1, a 5 N sulfuric acid saturated glass fiber paper membrane 1 is positioned between the electrode 2 prepared by the process of the invention and a suitable oxygen electrode 3, such as platinum. Abutting the electrodes are current collector screens 4 and 5 which comprise tantalum or other suitable inert metal. Tantalum wire mesh spacers 6 and 7 are employed to compress the collector screens against the electrodes providing for better contact between screen and electrode as well as electrode and matrix. The wire mesh spacers are positioned exteriorly to the current collectors. To the outside of the spacers are gaskets 8 and 9 of any suitable material, such as polytetrafluoroethylene or silicone rubber. These seal as well as separate the chambers containing reactants. Exterior to the gaskets are housing members 10 and 11 to which are inserted and attached thermocouple 12 and heat control probe 13 and having inlet stainless steel or other inert metal tubing 14 and 15 through which readily available hydrogen contaminated with carbon monoxide and oxygen are separately introduced into the fuel cell. Stainless steel tubing 16 and 17 are provided as vents for unused gases. Wire leads 18 and 19, connected onto current collector screens 4 and 5 are the conducting members through which current flows from and to the fuel cell through the external circuit when the fuel cell is in operation. The cell, secured by means of bolts 20 and nuts 21 as shown in FIGURE 2, can be heated when desired by an external electrical heating pad 22. The temperature of the cell, determined by thermocouple 12, is controlled by heat control probe 13.

Electrodes prepared in accordance with the process of the invention from mixtures of rhodium and tungsten oxide as well as mixtures of the latter including platinum and in which molybdenum oxide is or is not included as a catalyst component and their performance are set forth in the following examples which are merely illustrative and are not to be taken as limitative of the invention. Further, each of the examples incorporates the fuel cell defined by the above drawing. Unless otherwise stated, the parts are by weight.

*Example 1*

A mixture consisting of 15 parts of rhodium trichloride and 22.5 parts of ammonium metatungstate is added to a suitable reaction vessel to which water is added to dissolve the contents therein. The pH of the resultant acidic solution is adjusted to between about 10 and about 11, with sodium hydroxide. There is then added dropwise 200 parts (by volume) of a 10% aqueous sodium borohydride solution to the alkaline solution. A black precipitate is noted. Upon completion of the dropwise addition of sodium borohydride solution, the precipitate is recovered by filtration and the residue is washed with water and, finally, vacuum dried. Resultant black powder composition containing (a) 85 parts of rhodium and (b) 15 parts of a reduced, amorphous tungsten oxide is next blended with 37 parts (by volume) of a 60% aqueous dispersion of polytetrafluoroethylene waterproofing binder and formed into a tantalum supported fuel cell electrode with an overall noble metal loading of fifteen milligrams per square centimeter (15 mg./cm.$^2$).

A one-inch diameter electrode disc is cut from the so-formed sheet and is used as the anode opposite a conventional nine (9) mg./cm.$^2$ platinum cathode. The fuel cell, as hereinabove described, is operated with a 1.0% carbon monoxide and 99% hydrogen gas mixture as the fuel and 100% oxygen as the oxidant at 70° C. and a 5 N $H_2SO_4$ electrolyte.

*Example 2*

Into a suitable reaction vessel are added fifteen (15) parts of chloroplatinic acid (40% Pt), 15 parts of rhodium trichloride (40% Rh) and 22.5 parts of ammonium metatungstate. The mixture is dissolved in water. The pH of the resultant acidic solution is adjusted to between about 10 and about 11, with sodium hydroxide. There is then added dropwise 200 parts (by volume) of a 10% aqueous sodium borohydride solution to the alkaline solution. A black precipitate is noted and, upon completion of the sodium borohydride solution, it is recovered by centrifugation and the residue is washed with water and finally vacuum dried. Resultant black powder composition containing (a) 85 parts of platinum and rhodium and (b) 15 parts of a reduced, amorphous tungsten oxide is next blended with 37 parts (by volume) of a 60% aqueous dispersion of polytetrafluoroethylene waterproofing binder and formed into a tantalum supported fuel cell electrode with an overall noble metal loading of fifteen milligrams per square centimeter (15 mg./cm.$^2$).

A one-inch diameter electrode disc is cut from this sheet and is used as the anode opposite a conventional nine (9) mg./cm.$^2$ platinum cathode. The fuel cell as hereinabove described is operated with a 1.0% carbon monoxide and 99% hydrogen gas mixture as the fuel and 100% oxygen as the oxidant at 70° C. and a 5 N $H_2SO_4$ electrolyte.

In similar fashion, electrodes consisting of either (a) platinum alone or (b) platinum and rhodium in equal parts are prepared in accordance with the procedure of Example 2 above. The electrodes as prepared in Examples 1 and 2 are tested and the results are tabularized in Table I below.

TABLE I.—PERFORMANCE OF FUEL CELL ON 1.0% CO IN $H_2$ AT 70° C. WITH 5 N $H_2SO_4$ ELECTROLYTE

| | Current Density in ma./cm.$^2$ at— | | | |
|---|---|---|---|---|
| | 0.85 volt | 0.80 volt | 0.75 volt | 0.70 volt |
| Electrode having 15 mg. of noble metal/cm.$^2$ loading and containing: | | | | |
| Rh+"W" oxide [100 parts (85% Rh+15% W)] | 84 | 200 | 300 | 414 |
| Rh+Pt+"W" oxide [85 parts (50% Rh+50% Pt), 15 parts ("W" oxide)] | 82 | 186 | 292 | 396 |
| Rh+Pt+"W" oxide [85 parts (33⅓ Rh +66⅔ Pt), 15 parts ("W" oxide)] | 72 | 162 | 256 | 344 |
| Rh+Pt+"W" oxide [85 parts (20% Rh+80% Rh+80% Pt), 15 parts ("W" oxide)] | 56 | 112 | 168 | 224 |
| Pt+Rh [100 parts (50% Pt+50% Rh)] | 43 | 94 | 120 | 140 |
| Pt alone, 100 parts | 40 | 62 | 84 | 105 |
| Pt+"W" oxide [100 parts (85% Pt+15% "W" oxide)] | | <40 | 50 | 58 |

Pt=platinum; "W" oxide=tungsten oxide; and Rh=rhodium.

*Example 3*

Example 2 is repeated in every detail except that the fuel cell is operated at 150° C. utilizing hydrogen contaminated with 10% carbon monoxide and the matrix is saturated with 85% phosphoric acid. Substantially the same current densities are noted as in Table I above.

*Example 4*

The procedure of Example 1 is followed in every detail to prepare electrodes containing a variety of catalyst mixtures as illustrated in Table II below. The performance of a fuel cell utilizing 10% carbon monoxide in hydrogen as in Example 2 above and the results are summarized in said Table II.

TABLE II.—PERFORMANCE OF FUEL CELL ON 10.0% IN $H_2$ AT 70° C. WITH 5 N $H_2SO_4$ ELECTROLYTE

| | Current Density in ma./cm.$^2$ at— | | | |
|---|---|---|---|---|
| | 0.85 volt | 0.80 volt | 0.75 volt | 0.70 volt |
| Electrode having 15 mg. of noble metal/cm.$^2$ loading and containing: | | | | |
| Rh+"W" oxide [100 parts (85% Rh+ 15% "W" oxide)] | 51 | 111 | 153 | 196 |
| Rh+Pt+"W" oxide [85 parts (50% Rh+ 50% Pt) 15 parts ("W" oxide)] | 52 | 105 | 130 | 172 |
| Rh+Pt [100 parts (50% Rh+50% Pt)] | <40 | 48 | 60 | 70 |

From a consideration of the data presented utilizing the electrodes of the instant invention in each table, enhanced results are attained in contradistinction to cells operated with electrodes containing platinum, platinum and tungsten oxide mixtures, as well as those containing mixtures of rhodium and platinum.

I claim:

1. A solid rhodium catalyst polycomponent mixture consisting essentially of: (a) from about 0% to about 47.5% platinum, (b) from about 40.0% to about 95% rhodium, and (c) from about 5% to about 20% of an amorphous tungsten oxide, all percentages being by weight and wherein said platinum is present in an amount not greater than 50% by weight of said rhodium, said catalyst mixture being adapted for use in a fuel cell electrode that is incorporated in a fuel cell operative on the fuel side of said cell while utilizing hydrogen gas contaminated with from about 0.01% to about 20% carbon monoxide.

2. The catalytic mixture according to claim 1 in which the components thereof consist esentially of: 85% rhodium and 15% amorphous tungsten oxide.

3. The catalytic mixture according to claim 1 in which the components thereof consist esentially of: 47.5% rhodium, 47.5% platinum and 5% amorphous tungsten oxide.

4. In a fuel cell which employs oxygen as the oxidant and hydrogen gas as the fuel contaminated with from about 0.01% to about 20% carbon monoxide and utilizing catalytic electrodes separated by an electrolyte matrix, the improvement in combination therewith which consists essentially of: a waterproofed-catalytic electrode, said electrode consisting essentially of the rhodium catalyst mixture of claim 1.

5. In the fuel cell according to claim 4 wherein the electrode consists essentially of 85% rhodium and 15% amorphous tungsten oxide.

6. In the fuel cell according to claim 4 wherein the electrode consists essentially of 47.5% rhodium, 47.5% platinum and 5% amorphous tungsten oxide.

References Cited

UNITED STATES PATENTS

| 2,998,377 | 8/1961 | Beuther et al. | 252—470 |
| 3,232,887 | 2/1966 | Pessimisis | 252—470 |
| 3,248,267 | 4/966 | Langer et al. | 136—122 |

ALLEN B. CURTIS, *Primary Examiner.*

WINSTON A. DOUGLAS, *Examiner.*

A. SKAPARS, *Assistant Examiner.*